United States Patent
Harkness, IV et al.

(10) Patent No.: US 6,756,136 B1
(45) Date of Patent: Jun. 29, 2004

(54) CHROMIUM-ALLOY SEEDLAYERS FOR RECORDING MEDIA

(75) Inventors: Samuel Dacke Harkness, IV, San Francisco, CA (US); Roger Ristau, Livermore, CA (US); Li-Lien Lee, San Jose, CA (US); Rajiv Yadav Ranjan, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 149 days.

(21) Appl. No.: 09/781,975

(22) Filed: Feb. 14, 2001

Related U.S. Application Data

(60) Provisional application No. 60/182,281, filed on Feb. 14, 2000.

(51) Int. Cl.[7] ................. G11B 5/62; H01F 10/26; H01F 10/30
(52) U.S. Cl. ................. 428/694 T; 428/694 TS
(58) Field of Search ................. 428/694 T, 694 TS, 428/694 TM, 332, 457, 692

(56) References Cited

U.S. PATENT DOCUMENTS

| | | | | |
|---|---|---|---|---|
| 5,143,794 A | * | 9/1992 | Suzuki et al. | 428/611 |
| 5,298,324 A | * | 3/1994 | Ivett et al. | 428/336 |
| 5,316,631 A | | 5/1994 | Ando et al. | |
| 5,731,936 A | | 3/1998 | Lee et al. | |
| 5,989,673 A | | 11/1999 | Xiong et al. | |
| 6,001,447 A | * | 12/1999 | Tanahashi et al. | 428/65.3 |
| 6,110,582 A | | 8/2000 | Wu et al. | |
| 6,146,754 A | * | 11/2000 | Song et al. | 428/332 |
| 6,150,015 A | * | 11/2000 | Bertero et al. | 428/332 |

OTHER PUBLICATIONS

CRC Handbook of Chemistry and Physics, 81st Edition, 2000, Section 5–30.*

* cited by examiner

*Primary Examiner*—Paul Thibodeau
*Assistant Examiner*—Nikolas J Uhlir
(74) *Attorney, Agent, or Firm*—Morrison & Foerster LLP

(57) ABSTRACT

A magnetic recording medium on glass or Al substrates with a film structure of Cr—X or (Cr—X)$O_x$ seedlayer/underlayer/magnetic layer/carbon overcoat, in which the solid solubility of X is at least 3 atomic percent in Cr, the heat of oxide formation of X is less than that of Cr or a lattice tuning capability of X is at least 2% that of Cr and a manufacturing process thereof are disclosed.

14 Claims, 6 Drawing Sheets

CHROMIUM-ALLOY SEEDLAYERS FOR RECORDING MEDIA

RELATED APPLICATIONS

This application claims priority from Provisional Application Serial No. 60/182,281 filed Feb. 14, 2000, entitled "(Cr—X)O$_x$ Seedlayers for Longitudinal Recording Media," the entire disclosure of which is hereby incorporated herein by reference.

FIELD OF THE INVENTION

This invention relates to magnetic recording media, such as thin film magnetic recording disks, and to a method of manufacturing the media. The invention has particular applicability to high areal density magnetic recording media exhibiting low noise, and high coercivity.

BACKGROUND

The increasing demands for higher areal recording density impose increasingly greater demands on thin film magnetic recording media in terms of remanent coercivity (Hr), magnetic remanance (Mr), coercivity squareness (S*), medium noise, i.e., signal-to-medium noise ratio (SMNR), and narrow track recording performance. It is extremely difficult to produce a magnetic recording medium satisfying such demanding requirements.

The linear recording density can be increased by increasing the Hr of the magnetic recording medium, and by decreasing the medium noise, as by maintaining very fine magnetically non-coupled grains. Medium noise in thin films is a dominant factor restricting increased recording density of high-density magnetic hard disk drives, and is attributed primarily to inhomogeneous grain size and intergranular exchange coupling. Accordingly, in order to increase linear density, medium noise must be minimized by suitable microstructure control.

A conventional longitudinal recording disk medium is depicted in FIG. 1. It typically comprises a non-magnetic substrate 10 having sequentially deposited on each side thereof an underlayer 11, 11', such as chromium (Cr) or Cr-alloy, a magnetic layer 12, 12', typically comprising a cobalt (Co)-base alloy, and a protective overcoat 13, 13', typically containing carbon. Conventional practices also comprise bonding a lubricant topcoat (not shown) to the protective overcoat. Underlayer 11, 11', magnetic layer 12, 12', and protective overcoat 13, 13', are typically deposited by sputtering techniques. The Co-base alloy magnetic layer deposited by conventional techniques normally comprises polycrystallites epitaxially grown on the polycrystal Cr or Cr-alloy underlayer. A conventional perpendicular recording disk medium is similar to the longitudinal recording medium depicted in FIG. 1, but does not comprise Cr-containing underlayers.

Conventional methods for manufacturing longitudinal magnetic recording medium with a glass, glass-ceramic, Al or Al—NiP substrate comprise applying a seedlayer between the substrate and underlayer. A conventional seedlayer seeds the nucleation of a particular crystallographic texture of the underlayer. Typically, a seedlayer is the first deposited layer on the non-magnetic substrate. The role of this layer is to texture (alignment) the crystallographic orientation of the subsequent Cr-containing underlayer.

Furthermore, there exists a texture relationship between the underlayer and the magnetic layer. Therefore, the influence of the seed layer in terms of a texture relationship permeates even into the magnetic layer.

Conventional Cr-alloy underlayers comprise chromium (Cr), vanadium (V), titanium (Ti), tungsten (W) or molybdenum (Mo). Conventional magnetic layers are CoCrTa, CoCrPtB, CoCrPt, CoCrPtTaNb and CoNiCr.

A conventional longitudinal recording disk medium is prepared by depositing multiple layers of metal films to make a composite film. In sequential order, the multiple layer typically comprise a non-magnetic substrate, one or more underlayers, a magnetic layer, and a protective carbon layer. Generally, a polycrystalline epitaxially grown cobalt-chromium (CoCr) alloy magnetic layer is deposited on a chromium or chromium-alloy underlayer.

The seedlayer, underlayer, and magnetic layer are conventionally sequentially sputter deposited on the substrate in an inert gas atmosphere, such as an atmosphere of argon. A conventional carbon overcoat is typically deposited in argon with nitrogen, hydrogen or ethylene. Conventional lubricant topcoats are typically about 20 Å thick.

It is recognized that the magnetic properties, such as Hr, Mr, So and SMNR, which are critical to the performance of a magnetic alloy film, depend primarily upon the microstructure of the magnetic layer which, in turn, is influenced by one or more underlying layers on which it is deposited. It is also recognized that underlayers having a fine grain structure are highly desirable, particular for growing fine grains of hexagonal close packed (HCP) CoCr deposited thereon to form an intermediate layer. The HCP layer is thin and is used to absorb the interfacial strain occurring from the transition from a cubic crystal structure of the underlayer to a HCP structure of the magnetic layer.

In co-pending U.S. patent application Ser. No. 09/152,326 filed on Sep. 14, 1998, a magnetic recording medium is disclosed comprising a surface oxidized NiAl seedlayer, and sequentially deposited thereon a Cr-containing underlayer, a CoCrTa intermediate layer and a CoCrPtTa magnetic layer.

Adding various elements, including oxygen, to one or more underlayers has been shown to increase the coercive force in recording media. U.S. Pat. No. 5,523,173 discloses that a higher SMNR can be obtained if boron is added to an magnetic layer consisting of a CoPtCr alloy with a 1120 crystallographic orientation deposited on an underlayer with 100 orientation. U.S. Pat. No. 5,316,631 to Ando et al., discloses the incorporation of oxygen into a Cr underlayer. The Cr underlayer contains 4 to 50 atomic percent oxygen. Oxygen may also be added to a CoCr underlayer in an amount of 15 to 30 atomic percent.

In order to squeeze as much digital information as possible on a recording disc medium there will be a continuing need for improved areal density magnetic recording media exhibiting high coercivity and high SMNR.

SUMMARY OF THE INVENTION

The invention provides a magnetic recording medium for high areal recording density exhibiting low noise, high coercivity. One way of achieving this goal is to produce a magnetic film with substantial directional magnetic isotropy.

Another aspect of this invention is a method of manufacturing a magnetic recording medium which exhibits excellent overwrite properties, little or no modulation of magnetic properties, relatively high SMNR and high areal recording densities.

An embodiment of this invention is a magnetic recording medium, comprising: a substrate; a seedlayer disposed on the substrate, wherein the seedlayer comprises a Cr—X containing material; and a magnetic layer, wherein a solid solubility of the X is at least 3 atomic percent in Cr. Preferably, a heat of oxide formation of the X is less than that of Cr and a lattice tuning capability of the X is at least 2% that of Cr. Typically, X is selected from the group consisting of aluminum, calcium, titanium, vanadium, manganese, iron, cobalt, nickel, zinc, or a mixture thereof. The magnetic recording medium could further comprise an underlayer comprising a Cr-containing material, for example, a CoCr underlayer to form a first magnetic recording medium. The first magnetic recording medium could exhibit a stronger CoCr (11.0) peak by X-ray crystallography than that of a second magnetic recording medium that is similar to the first magnetic recording medium except that the seedlayer of the second magnetic recording medium contains substantially pure Cr with no Cr—X containing material. For example, the seedlayer of the first magnetic recording medium could comprise Cr-10W and the CoCr underlayer could comprise Co-37Cr.

In another embodiment, the seedlayer could have a Cr—X (110) interplanar spacing that is roughly equivalent to a (0002) interplanar spacing of a HCP alloy of a CoCr underlayer or a magnetic layer. In yet another embodiment of this invention, a portion of the seedlayer is oxidized.

One embodiment of this invention is a method of manufacturing a magnetic recording medium, comprising: depositing a seedlayer comprising a Cr—X containing material on a substrate; and depositing a magnetic layer on the seedlayer, wherein a solid solubility of the X is at least 3 atomic percent in Cr.

Another embodiment of this invention is a magnetic recording medium comprising: means for low noise recording and a magnetic layer.

A "means for low noise recording" comprises a layer comprising a Cr—X containing material, wherein a solid solubility of said X is at least 3 atomic percent in Cr, a heat of oxide formation $(-\alpha H_f)$ of said X is greater than 200 kcal/(gmol) or a lattice tuning capability of said X is at least 2% that of Cr. Preferably, the means for low noise recording is a seedlayer comprising a Cr—X material, a portion of which is oxidized.

As will be realized, this invention is capable of other and different embodiments, and its details are capable of modifications in various obvious respects, all without departing from this invention. Accordingly, the drawings and description are to be regarded as illustrative in nature and not as restrictive.

DETAILED DESCRIPTION

This invention provides magnetic recording media suitable for high areal recording density exhibiting high coercivity and high SMNR. This invention achieves such technological advantages by oxidizing a portion of the seedlayer. The term "a portion of" is defined herein to include all or part of the seedlayer. Therefore, the entire seedlayer, i.e., extending from one end of the seedlayer to the opposite end of the seedlayer may be in the oxidized form. The seedlayer may contain chromium or chromium alloyed with a material X, which is preferably one or more metals. The metal is incorporated to affect the oxidation characteristics of the seedlayer, as well as the lattice tuning capacity. The term "lattice tuning capacity" means that the addition of one or more metals to the chromium results in the lattice constant to be expanded or contracted relative to chromium. The term "substantially pure chromium" means a chromium containing material that does not have a material whose solid solubility is at least 3 atomic percent in chromium.

Metals that may be used include any first row transition metal as well as aluminum and calcium. Desirably, tungsten, molybdenum, titanium, and/or vanadium is added to improve lattice matching; manganese and/or copper is added to improve diffusion characteristics; and aluminum, titanium, and/or calcium is added for their inherent gettering ability. "Gettering ability" relates to the ability of a substance to bind a material on its surface.

The Cr—X alloy films also have the added advantage of forming more stable oxides upon oxidation than a non-metal alloy chromium film. The Cr—X alloy oxide films will have a change in the heat of oxide formation $(-\Delta H_f)$ that is greater than a chromium oxide film for a particular oxygen content. Preferably, the Cr—X alloy oxide films will have a $-\Delta H_f$ that is greater than 200 kcal/gmol or greater than a chromium oxide film for a particular oxygen content. More preferably, the Cr—X alloy oxide films will have a $-\Delta H_f$ that is greater than that of Cr, which is 269.7 kcal/gmol, for a particular oxygen content.

Figure 1:
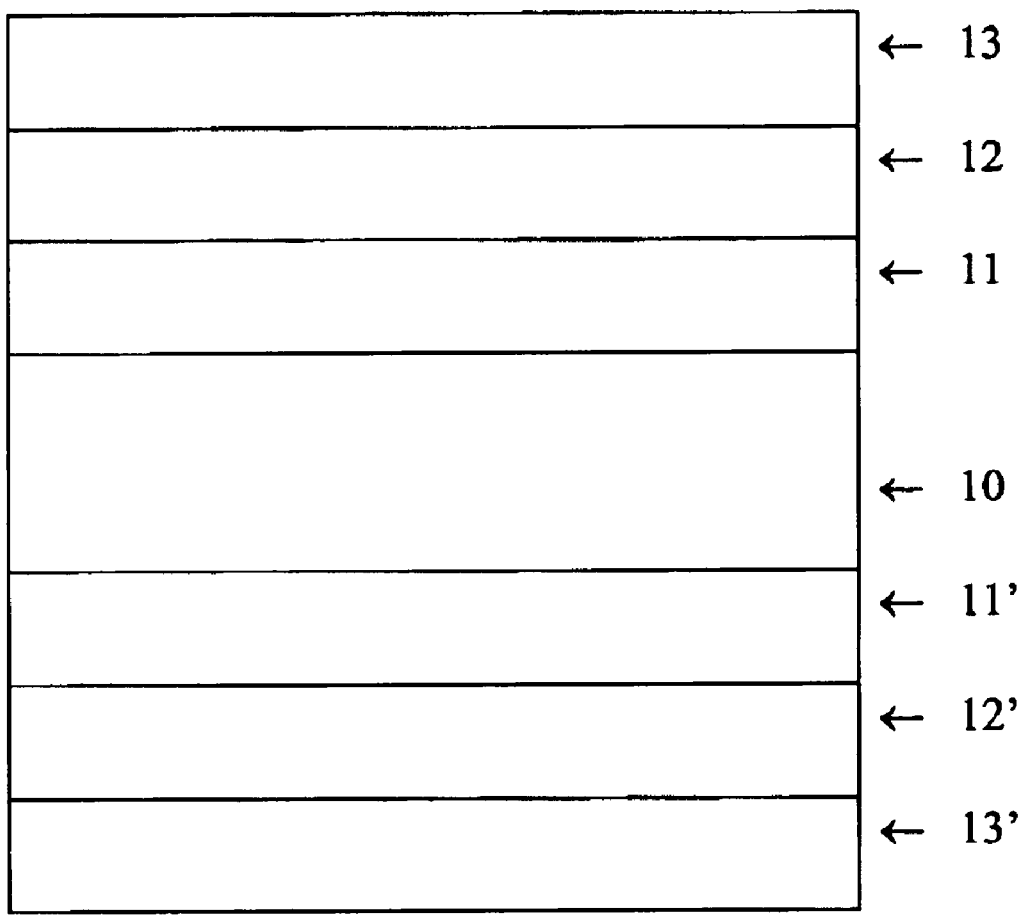
FIG. 1 is a schematic representation of the film structure in accordance with a magnetic recording medium of the prior art.
Figure 2:
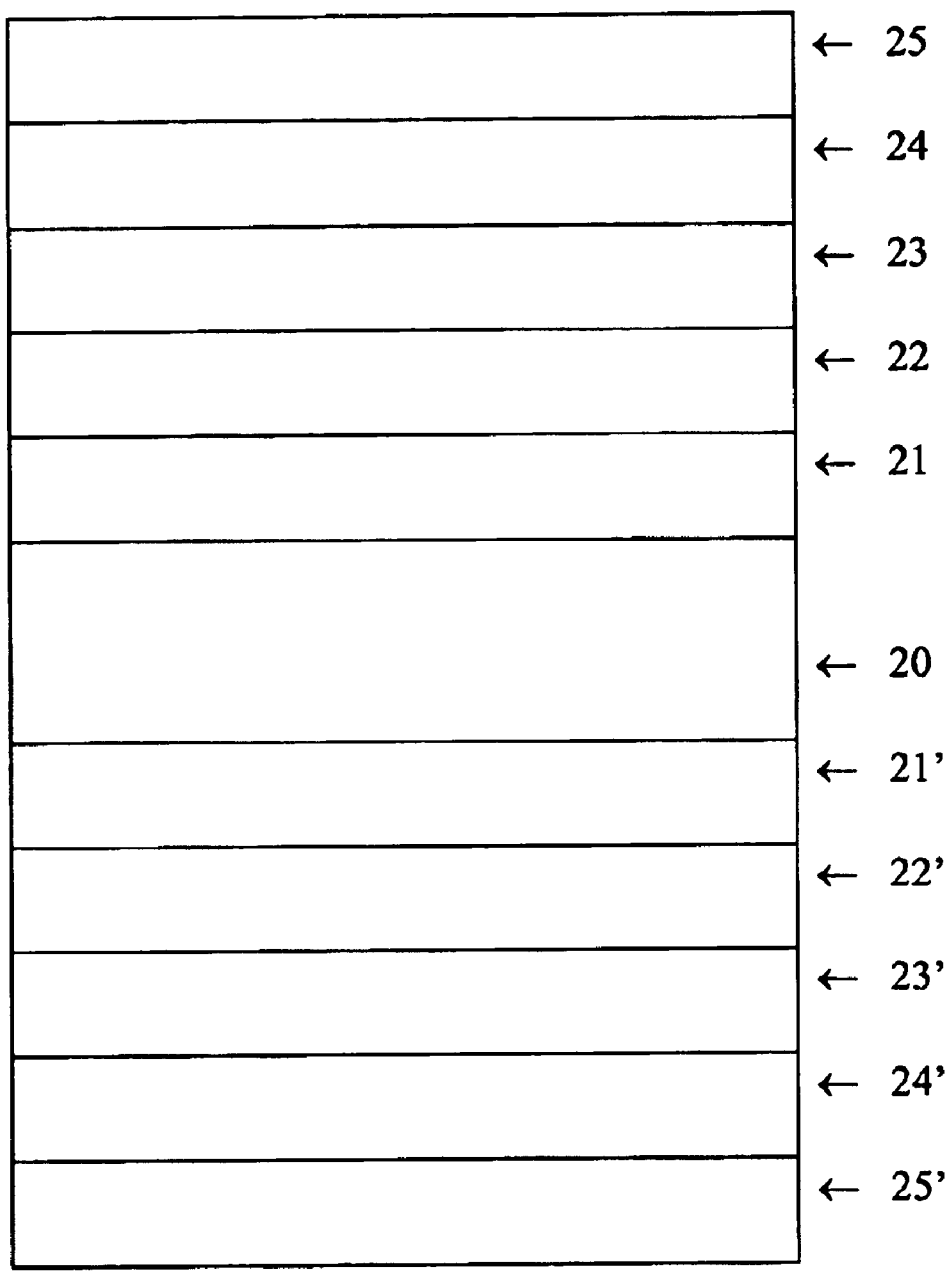
FIG. 2 is a schematic representation of the film structure in accordance with an embodiment of this invention.

In one embodiment of this invention, a Cr-containing underlayer is interposed between the seedlayer and the magnetic layer. In another embodiment, the sequential stacking arrangement of the layers on the substrate is as shown in FIG. 2. FIG. 2 shows a non-magnetic substrate 10 having sequentially deposited on each side thereof a Cr—X or (Cr—X)O$_x$ seedlayer 21, 21', an Cr-containing underlayer 22, 22', a CoCr-containing intermediate layer 23, 23', a magnetic layer 24, 24', typically comprising a cobalt (Co)-base alloy, and a protective overcoat 25, 25', typically containing carbon. The role of the underlayer is to improve the crystallinity of the subsequent interface with the intermediate layer as well as to more closely assimilate the lattice parameters of the intermediate and magnetic layers.

The seedlayer is deposited, preferably by a physical sputtering method known in the art, on the non-magnetic substrate. Alternatively, an adhesion layer may be deposited on the substrate followed by the seedlayer. For example, a NiAl layer deposited on an aluminum plated NiP substrate. The chromium-metal alloy seedlayer is then deposited on the NiAl layer. The seedlayer is then oxidized by a reactive sputtering technique in a argon-oxygen environment. The amount of oxygen in the argon-oxygen environment is from 1% to 80% by volume oxygen, preferably 1% to 50% by volume oxygen, more preferably 1% to 25% by volume oxygen. The amount of oxygen in the oxidized portion of the seedlayer may vary from about 0.0001 atomic percent to 20 atomic percent, preferably from about 0.001 atomic percent to 10 atomic percent, and most preferably 0.01 atomic percent to 0.9 atomic percent.

An important role of the oxidized seedlayer is to texture the crystallographic orientation of the seedlayer. The oxidized seedlayer has substantially uniform grain diameter, which is then carried through subsequent chromium containing layers. Generally, one or more underlying layers are used below the magnetic layer for longitudinal magnetic recording media. The underlying layers are chosen to obtain an underlayer exhibiting a (200) or (112)-dominant crystallographic orientation to induce a (1120) or (1010)-dominant crystallographic orientation in the magnetic layer deposited and epitaxially grown thereon.

In accordance with embodiments of this invention, a Cr—X alloy seedlayer is deposited on a substrate. The substrates that may be used in the invention include glass, glass-ceramic, NiP/aluminum, metal alloys, plastic/polymer material, ceramic, glass-polymer, composite materials or other non-magnetic materials. The Cr—X alloy seedlayer is oxidized in part or in its entirety to form a surface seedlayer of $(Cr-X)O_x$; wherein X is one or more of the alloying materials. The $(Cr-X)O_x$ alloy seedlayer may form a (112) surface orientation when deposited on a B2 structured underlayer such as NiAl. A Cr underlayer is deposited on the $(Cr-X)O_x$ seedlayer. Then, a magnetic layer having a substantially (10.0) crystallographic orientation is deposited on the Cr underlayer.

Desirably, the lattice constant and the crystal plane of the $(Cr-X)O_x$ seedlayer closely matches that of the Cr underlayer. As a consequence of lattice and crystalline plane matching, the magnetic layer will grow in a close-packed hexagonal structure with a (1010) crystallographic orientation. Moreover, the grains of the magnetic layer will have a (1010) orientation, and be substantially randomly distributed in the disc surface plane. As a result, the subsequently deposited magnetic layer exhibits a close-packed hexagonal structure with the magnetic easy axis, c-axis, lying in the film plane, but the axis is randomly distributed inside the film plane.

In one embodiment, the structure of the recording medium is the following: a glass or glass-ceramic substrate, a $(Cr-X)O_x$ seedlayer on the substrate, a MoCr or a CoCr underlayer on the $(Cr-X)O_x$ seedlayer, a CoCrPtB magnetic layer on the MoCr or a CoCr underlayer and a protective overcoat on the magnetic layer.

The thickness of the $(Cr-X)O_x$ seedlayer is about 100 Å to about 2000 Å, the thickness of the Cr underlayer is about 10 Å to about 1000 Å, and the thickness of the magnetic layer is about 100 Å to about 300 Å.

In the preferred embodiment, a CoCr intermediate layer is deposited on a Cr underlayer which is deposited on a $(Cr-X)O_x$ seedlayer. A magnetic layer is then deposited on the CoCr underlayer. Another embodiment of this invention includes depositing a thin intermediate magnetic layer on the underlayer and depositing the magnetic layer on the intermediate layer. The intermediate layer comprises a CoCrTa layer, which can comprise about 10 to about 40 atomic percent Cr and about 0 to about 6 atomic percent Ta. Embodiments of this invention include the use of any of the various magnetic alloys containing B, Cr and Co, such as CoCrB, CoCrPtB, CoCrNiB, CoCrNiPtB, CoCrNiTaB, CoCrNiNbB, CoCrPtTaB, CoCrPtNbB and CoCrPtTaNbB, and other combinations of B, Cr, Co, Pt, Ni, Ta and Nb, in the magnetic layer.

In another embodiment, the Cr underlayer is not applied to the $(Cr-X)O_x$ seedlayer. Instead, the CoCr underlayer is deposited on the $(Cr-X)O_x$ seedlayer. The magnetic layer is then deposited on the CoCr underlayer.

The formation of a magnetic layer exhibiting substantial two-dimensional directional magnetic isotropy is advantageous in many respects. For example, a magnetic recording medium comprising a magnetic layer characterized by substantial directional magnetic isotropy exhibits significantly improved overwrite characteristics and significantly reduced magnetic property modulation, particularly reduced $H_c$ modulation in the circumferential direction. In addition, directional magnetic isotropy avoids any substantial nonlinear noise behavior at high recording densities.

In a preferred embodiment, the thickness of the seedlayer is 200 Å to about 1600 Å, preferably between 300 Å and 1200 Å, and most preferably about 600 Å. The thickness of the underlayer is 12 Å to about 500 Å, preferably between 15 Å and 250 Å, and most preferably about 25 Å. The thickness of the magnetic layer is 150 Å to about 250 Å, preferably between 175 Å and 225 Å, and most preferably about 200 Å. The thickness of the protective layer is 20 Å to about 300 Å, preferably between 30 Å and 100 Å, and most preferably about 50 Å. The protective layer is made of hydrogenated carbon ($CH_x$).

The magnetic recording medium has a remanent coercivity of about 2000 to about 10,000 Oersted, and an Mrt (product of remanance, Mr, and magnetic layer thickness, t) of about 0.2 to about 2.0 memu/cm$^2$. In a preferred embodiment, the coercivity is about 2500 to about 9000 Oersted, more preferably in the range of about 3000 to about 6000 Oersted, and most preferably in the range of about 3350 to about 5000 Oersted. In a preferred embodiment, the Mrt is about 0.25 to about 1 memu/cm$^2$, more preferably in the range of about 0.3 to about 0.7 memu/Cm$^2$, and most preferably in the range of about 0.3 to about 0.6 memu/cm$^2$.

Embodiments of this invention include sputter depositing a Cr—X seedlayer on a glass or glass-ceramic substrate and oxidizing the surface of the sputter deposited Cr—X seedlayer at a suitable temperature, e.g., about 100° C. to about 300° C., in an oxidizing atmosphere to form a $(Cr-X)O_x$ seedlayer. Suitable oxidizing atmospheres contain about 1 to about 100, preferably about 5 to about 80, volume percent of oxygen ($O_2$), the remainder being an inert gas, such as argon (Ar), e.g., about 1 to about 50 volume percent oxygen, such as about 20 percent by volume oxygen. The degree of oxidation can be such that the amount of oxygen in the top 50 Å $(Cr-X)O_x$ seedlayer, after in situ sputter removal of the 40 Å surface layer, is about 15 atomic percent to about 50 atomic percent, such as about 20 atomic percent to about 30 atomic percent.

EXAMPLES

All samples described in this disclosure were fabricated with DC magnetron sputtering except carbon films were made with AC magnetron sputtering.

Figure 3:
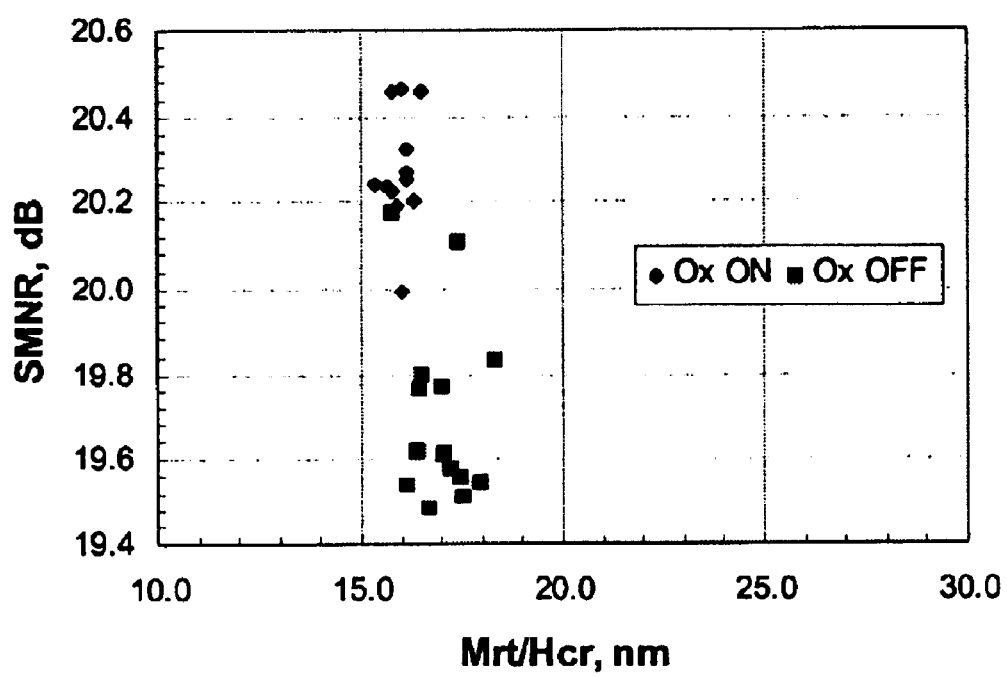
FIG. 3 graphically illustrates the signal to medium noise ratio (SMNR) for non-oxidized and oxidized seedlayer of exemplar recording media of this invention as a function of transition parameter analog.

FIG. 3 shows a comparison of signal-to-medium noise ratio of a recording disc medium with an oxidized Cr alloy seedlayer and a non-oxidized Cr alloy seedlayer. In FIG. 3, "Ox ON" and "Ox OFF" mean with and without oxidation. SMNR was measured using a Guzik 1701 MP spinstand. It analyzes the noise spectrum from the output of any read head you attach to it. The background noise and dc-noise were subtracted to leave only the noise coming from the media itself. Mrt/Hcr is a parameter used here as an analog to the transition parameter. SMNR data is normally plotted as a function of Mrt/Hcr so as to normalize the effects of more transition sharpness from higher coercive force and less demagnetizing field from lower Mrt.

The oxidized seedlayer could result in an enhancement in SMNR from about 0.3 dB to about 1 dB. Oxidation of the seedlayer also yields improvements in a variety of recording characteristics vis-à-vis substantially the same media with a non-oxidized Cr alloy seedlayer. FIG. 3 shows that the signal to medium noise ratio as a function of transition parameter analog is enhanced by 0.5 to 1 dB due to the oxidation of the Cr seedlayer. This improvement is significant because one obtains one order of magnitude decrease in the error rate for every dB gain in SMNR.

Figure 4:
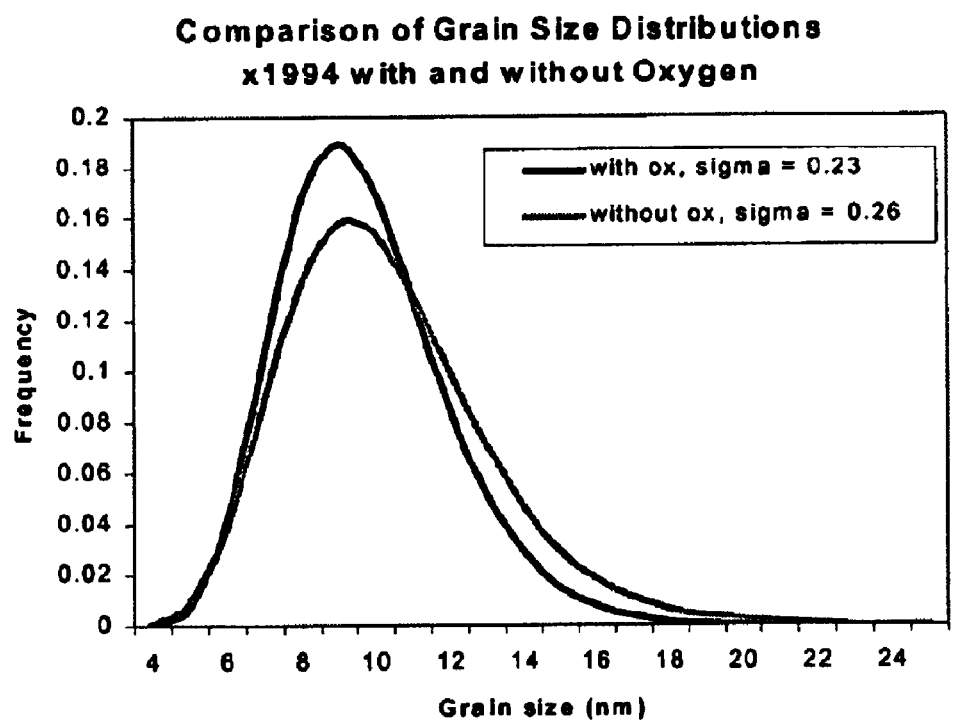
FIG. 4 graphically illustrates the distribution of grain sizes for oxidized and non-oxidized seedlayers.

FIG. 4 shows the corresponding plan-view TEM results of the samples of FIG. 3. Plan view TEM micrographs were analyzed. Hand tracing was done to get a silhouette image of the grain structure. Two-axis measurements were made of each countable grain and the statistics shown in Table 1 calculated.

FIG. 4 is a comparative histogram summary plots showing enhancement in grain size refinement and distribution for the oxidized seedlayer case. FIG. 4 shows that the grain size distribution of the oxidized seedlayer is narrower than that of the non-oxidized seedlayer. Table 1 provides the statistical values for the oxidized seedlayer is narrower and the non-oxidized seedlayer. There is a subtle, but distinct difference in the mean grain size, i.e., 9.7 nm for the oxidized seedlayer and 10.3 nm for the non-oxidized seedlayer. More importantly, the narrower (substantially uniform) grain size distribution, i.e. $\sigma/\mu=0.23$ versus $\sigma/\mu=0.27$ in the seedlayer is then carried throughout the succeeding layers, including the magnetic layer.

TABLE I

Summary of Grain Size Analysis Between Oxidized and Non-Oxidized Seedlayer Cases

| Grain Size Statistics 1994 Ox | | Grain Size Statistics 1994 w/o Ox | |
|---|---|---|---|
| Mean | 9.7 | Mean | 10.3 |
| Median | 9.5 | Median | 9.9 |
| Mode | | Mode | |
| Minimum | 4.7 | Minimum | 4.8 |
| Maximum | 18.8 | Maximum | 21.4 |
| Range | 14.1 | Range | 16.6 |
| Standard Deviation | 2.2 | Standard Deviation | 2.7 |
| Std. Dev/Mean | 0.23 | Std. Dev/Mean | 0.26 |
| Count | 618 | Count | 615 |

FIG. 3 shows that by using an embodiment of this invention one is able to improve the intrinsic noise capability of a recording medium. FIG. 4 shows that the grain size is refined and is made more uniform when using an embodiment of this invention.

Figure 5:
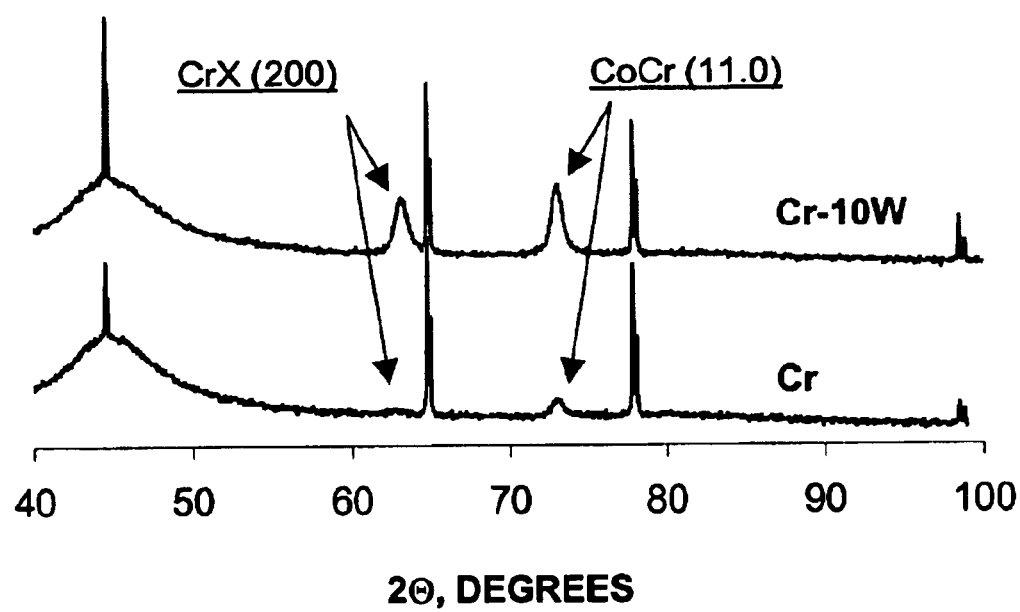
FIG. 5 shows the X-ray crystallography data of a medium comprising a bilayer of a Co-37Cr underlayer and a Cr-10W seedlayer and that of another medium comprising another bilayer of a Co-37Cr underlayer and a Cr seedlayer.

FIG. 5 shows the X-ray diffraction (XRD) data of two bilayer structures. The first bilayer structure contains a Cr seedlayer and a Co-37Cr underlayer on the Cr seedlayer. The second bilayer structure contains a Cr-10W seedlayer and a Co-37Cr underlayer on the Cr seedlayer. The 10 atomic percent W in the seedlayer of the second bilayer was to determine the effect of adding the additive X in the seedlayer forming a Cr—X seedlayer.

The explanation of the XRD data of FIG. 5 is as follows. It can be seen that the CrW seedlayer yields a stronger intensity for the (11.0) peak than when for the case when the seedlayer contains no W. One can generally assume that this is due to the improvement in the degree of orientation of the Co grains of the underlayer in the presence of W in the seedlayer. That is, the CrW is more strongly (200)-oriented; thus, allowing a stronger (11.0) texture in the adjoining Co grains of the Co-37Cr underlayer. One should not, however, directly compare the (200) XRD peaks for Cr, CrW seedlayers because of the structure factor variations induced by the presence of an added metal, such as W, in the seedlayer. Therefore, it is always best to compare the intensities of the similar Co-37Cr underlayers.

Figure 6:
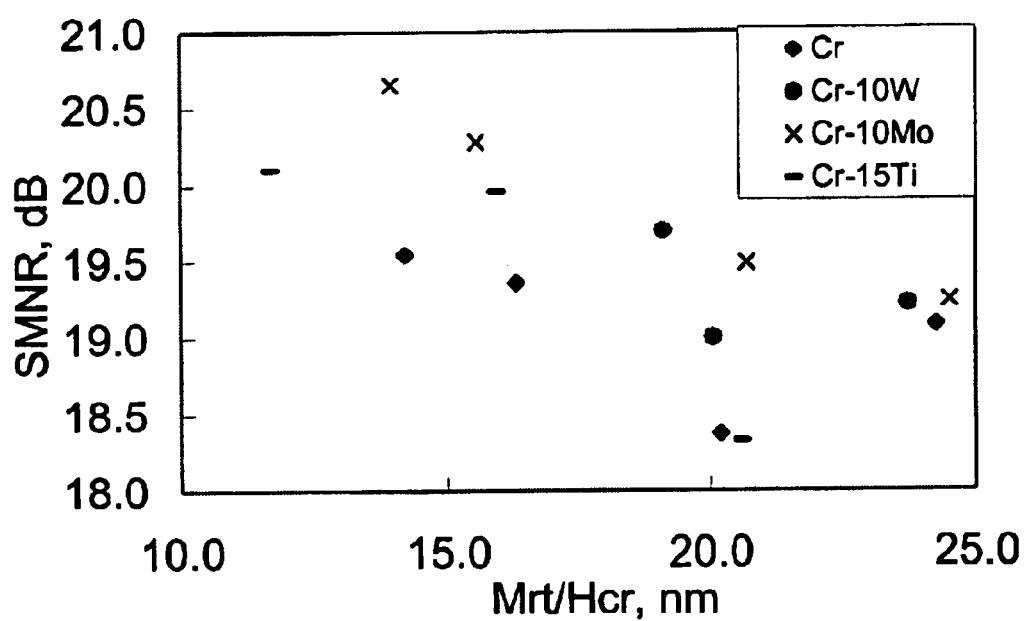
FIG. 6 shows the recording performance for a CrCrPt-TaNb magnetic layer on select underlayers of Cr, Cr-10W, Cr-10Mo and Cr-15Ti.

FIG. 6 shows a CoCrPtTaNb magnetic layer on select seedlayers. FIG. 6 shows that the addition of W, Mo and Ti to a Cr seedlayer enhances the SMNR performance of the magnetic layer. FIG. 3 shows that the SMNR performance of a magnetic layer could be improved by oxidizing a Cr seedlayer. Therefore, combining the results of FIGS. 3 and 6, oxidized Cr—X alloys could be utilized as seedlayers to further enhance the SMNR performance and the lower noise of recording media. Alloy additions are selected for oxidation and lattice tuning characteristics. The result of the $(Cr—X)O_x$ seedlayer when incorporated with a non-oxidized underlayer would be a refined grain structure of tighter distribution. The non-oxidized underlayer could maintain the texture throughout the multilayer structure and yet prevent direct contact of the oxidized Cr—X seedlayer with the magnetic layer. If the oxidized Cr—X layer is near or in direct contact with the magnetic layer, there is a possibility that the oxygen migration into the magnetic layer could be high enough to detract the recording performance.

A recording medium having a $(Cr—X)O_x$ could be made as follows. Select one or more elemental additions to Cr such that the resulting alloy is more apt to form a stable oxide than is Cr. Therefore, any element possessing an oxide heat of oxide formation such that $-\Delta Hf<269.7$ kcal/gmol could be used because this is the heat of oxide formation for $Cr_2O_3$, the most stable oxide of Cr. To prepare the material for thin film processing, a target should be created. To ensure that the resulting target is reasonably free from second-phase allotropies (such as intermetallics), only those elemental additions that have greater than a 3 atomic percent solid solubility in Cr should be chosen. Select the alloy composition such that the resulting Cr—X (100) interplanar spacing is roughly equivalent to a (0002) interplanar spacing of a HCP alloy of a CoCr underlayer or a magnetic layer which is directly coupled to the Cr—X layer. The Cr—X layer could be Cr-10W.

In preparation of the films with a controllable amount of incorporated oxide, it is possible to either controllably dope the target or to reactively sputter in a halogen-oxygen environment. Doping the target offers the advantage of having less detrimental oxygen free in the sputter chamber, while reactive sputtering offers better control of oxidation level. To utilize oxygen-doped targets, select an oxygen level between 0.01 and 0.9 atomic percent. Beyond this range, it might be intractable to maintain crystallographic integrity as the oxide component of the film may exceed the metallically bonded volume. To utilize reactive sputtering, the flow ratio should be set between Ar and $O_2$ such that oxygen makes up between 1% and 5% of the gas volume (pressure). The precise amount of incorporated oxygen is to be experimentally determined according to the alloy additions chosen; for more stable oxide-forming alloys, less oxygen would be needed in processing.

Procure NiP-coated substrates and clean them using a conventional cleaning/polishing processing available at any media production facility, which are described below. Load the substrates into a vacuum processing system capable of multilayer sputter processing. This system must include heating, sputtering (dc or rf magnetron), cooling, and carbon overcoat sputtering capability.

The process phases would proceed as follows:

(1) Heat substrate to approximately 280° C. in a vacuum ambient (<1×10$^{-6}$ Torr). The low metallic-like emissivity of the NiP surface (as well as for the sputtered layers) allows on time heating at the front end of the vacuum process.

(2) Apply an 80 Å thick Cr—X—O layer using either of the oxidation modes listed above at a deposition rate of ~50 Å/s while maintaining a substrate bias of –300 Volts and an overall Ar+O pressure of 5 mTorr.

(3) Apply a 60 Å thick Cr—X layer via sputtering at a deposition rate of ~25 Å/s while maintaining –100 Volts substrate bias and an argon pressure of 5 mTorr.

(4) Apply an intermediate layer composed of identical portions of the magnetic layer alloy additions with sufficiently more Cr so as to render the material non-magnetic (>30 atomic percent) to a thickness of 35 Å using a deposition rate of ~25 A/s while maintaining a substrate bias of –450 Volts and an argon pressure of 5 mTorr. This layer will allow the bcc-hcp transition to occur without sacrifice of anisotropy in the magnetic layer.

(5) Apply sufficient thickness of the chosen magnetic layer so as to achieve a remanence times thickness, $M_r t$ equal to 0.4 memu/cm$^2$ at a deposition rate of 200 Å/s and a substrate bias of –250 Volts and an argon pressure of 8 mTorr.

(6) Cool substrate below 150 ° C. in a helium ambient of 10 T.

(7) Apply a 50 Å overcoat at a deposition rate of ~100 Å/s wherein the substrate is resistively connect to ground through a 100 MΩ resistor.

Once this vacuum process is completed, apply a 20 Å Z-Tetrol lubricant to the finished surface, then buff, wipe, and burnish the media. If done correctly, the media should pass 0.35 micro-inch ($\mu$in) glide testing and can be evaluated using a Guzik spinstand parametric tester. This test will reveal a 0.5 to 1.5 dB improvement in signal-to-medium noise ratio (SMNR) when compared to a similarly processed sample without the invented layers (a simple Cr underlayer in lieu).

The cleaning/polishing methods and the cleaning/polishing means that can employed are any one or more of the methods shown below.

Mechanical Polishing

Persons skilled in this art would recognize that the variables that control mechanical polishing are:

(1) substrate surface initial condition: roughness, waviness, substrate size, substrate shape and grain size;

(2) polishing slurry size($Al_2O_3$, $CeO_2$, $SiO_2$, etc) and coolant (inorganic and organic solutions with lubricant);

(3) polishing time and surface finishing; and (4) washing and cleaning substrate surface Chemical Polishing Persons skilled in this art would recognize that the variables that control chemical polishing are:

(1) substrate surface initial condition: roughness, waviness, substrate size, substrate shape and grain size;

(2) polishing solutions compositions and their ability to dissolve the substrate materials;

(3) the composition consists of a combination of different acids (e.g. nitric, sulfric, hydrochloric, phosphoric, chromic, acetic) or organic solutions (e.g. methanol, glycerin, ethyldiglicol), also containing some added electropositive ions. E.g., polishing of Al: small amounts of Cu will create additional local cathodes by deposition on Al, stimulating the polishing process. Adding some oxidants has a function as depolarization agents.

Electrochemical Polishing

Persons skilled in this art would recognize that the variables that control electrochemical polishing are:

(1) The external source of electricity to produce the anodic current density and voltage;

(2) the electrolyte temperature;

(3) the time duration of electropolishing;

(4) the cathodic materials; in general, the cathode surface should be many times larger than that of electropolished substrate. Different materials are used as cathodes depending on the applied electrolyte; and (5) agitation, which can eliminates the undesired concentration of the dissolved material at the substrate. Agitation can improve the supply of fresh electropolishing electrolyte to substrate surface. Agitation can prevent local heating and release gas bubbles from the polished surface to avoid pitting on the substrate surface CMP (Chemical Mechanical Polishing) used in semiconductor wafer polishing. Persons skilled in this art would recognize that the variables that control the CMP process.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. The entire disclosure of the patents and publications referred in this application are hereby incorporated herein by reference.

What is claimed is:

1. A magnetic recording medium, comprising:

a substrate;

a seedlayer directly disposed on the substrate, wherein the seedlayer comprises a Cr—X containing material and a portion of the seedlayer is oxidized;

a non-oxidized Cr-containing first underlayer;

a second underlayer can an HCP alloy; and a magnetic layer, in this order, wherein a solid solubility of said X is at least 3 atomic percent in Cr, and said X is selected from the group consisting of aluminum, calcium, titanium, vanadium, manganese, iron, cobalt, nickel, zinc, or a mixture thereof, and further wherein grains of the seedlayer in the medium has a lower sigma/mean than that of an unoxidized seedlayer in a similar medium.

2. The magnetic recording medium of claim 1, further wherein a heat of oxide formation of said X is less than that of Cr and a lattice tuning capability of said X is at least 2% that of Cr.

3. The magnetic recording medium of claim 1, wherein the oxidized portion of the seedlayer contains from about 0.0001 atomic percent oxygen to about 20 atomic percent oxygen.

4. The magnetic recording medium of claim 1, wherein the oxidized portion of the seedlayer contains from about 0.01 atomic percent oxygen to about 0.9 atomic percent oxygen.

5. The magnetic recording medium of claim 1, wherein the seedlayer has a Cr—X (110) interplanar spacing that is substantially equivalent to a (0002) interplanar spacing of the HCP alloy in the second underlayer.

6. The magnetic recording medium of claim 1, wherein the second underlayer comprises a CoCr-containing material to form a first magnetic recording medium, the first magnetic recording medium exhibiting a stronger CoCr (11.0) peak by X-ray crystallography than that of a second magnetic recording medium that is similar to the first magnetic recording medium except that the seedlayer of the second magnetic recording medium contains substantially pure Cr.

7. The magnetic recording medium of claim 6, wherein the seedlayer of the first magnetic recording medium comprises Cr-10W and the CoCr-containing underlayer comprises Co-37Cr.

8. A method of manufacturing a magnetic recording medium, comprising:
    depositing a seedlayer comprising a Cr—X containing material directly on a substrate, wherein a portion of the seedlayer is oxidized;
    depositing a non-oxidized Cr-containing first underlayer;
    depositing a second underlayer comprising an HCP alloy; and
    depositing a magnetic layer, in this order,
    wherein a solid solubility of said X is at least 3 atomic percent in Cr, and said X is selected from the group consisting of aluminum, calcium, titanium, vanadium, manganese, iron, cobalt, nickel, zinc, or a mixture thereof, and further wherein grains of the seedlayer in the medium has a lower sigma/mean than that of an unoxidized seedlayer in a similar medium.

9. The method of manufacturing a magnetic recording medium of claim 8, further wherein a heat of oxide formation of said X is less than that of Cr and a lattice turning capability of said X is at least 2% that of Cr.

10. The method of manufacturing a magnetic recording medium of claim 9, wherein the oxidized portion of the seedlayer contains from about 0.01 atomic percent oxygen to about 0.9 atomic percent oxygen.

11. The method of manufacturing a magnetic recording medium of claim 9, wherein the oxidized portion of the seedlayer has a mean grain size diameter of 10 nm or less.

12. The method of manufacturing a magnetic recording medium of claim 9, wherein the seedlayer has a Cr—X (110) interplanar spacing that is substantially equivalent to a (0002) interplanar spacing of the HCP alloy in the second underlayer.

13. The method of manufacturing a magnetic recording medium of claim 8, wherein the second underlayer comprises a CoCr-containing material to form a first magnetic recording medium, the first magnetic recording medium exhibiting a stronger CoCr (11.0) peak by X-ray crystallography than that of a second magnetic recording medium that is manufactured similarly to the first magnetic recording medium except that the seedlayer of the second magnetic recording medium contains substantially pure Cr.

14. A magnetic recording medium comprising:
    an oxidized means for low noise recording directly on a substrate,
    a magnetic layer,
    a non-oxidized underlayer comprising a Cr-containing material and a layer allowing a BCC-HCP transition to occur between the underlayer and the magnetic later, and further wherein grains of the seedlayer in the medium has a lower sigma/mean than that of an unoxidized seedlayer in a similar medium.

* * * * *